Sept. 20, 1971   P. M. STRONG   3,606,365
ACTIVE SUSPENSION SYSTEM FOR A VEHICLE
Filed Nov. 3, 1969

INVENTOR.
PHILIP M. STRONG
BY
Edward M. Farrell
ATTORNEY

United States Patent Office 3,606,365
Patented Sept. 20, 1971

3,606,365
ACTIVE SUSPENSION SYSTEM FOR A VEHICLE
Philip M. Strong, Philadelphia, Pa., assignor to
The Budd Company, Philadelphia, Pa.
Filed Nov. 3, 1969, Ser. No. 873,261
Int. Cl. B60g 17/04
U.S. Cl. 280—6H
9 Claims

ABSTRACT OF THE DISCLOSURE

An active suspension system includes a fluid operated piston to compensate for irregular movements of a main body of a vehicle. A detector detects the movement of the body out of a predetermined plane of movement and controls the amount of fluid actuating the piston to maintain the body close to its predetermined plane as it is moved.

---

Figure 1:
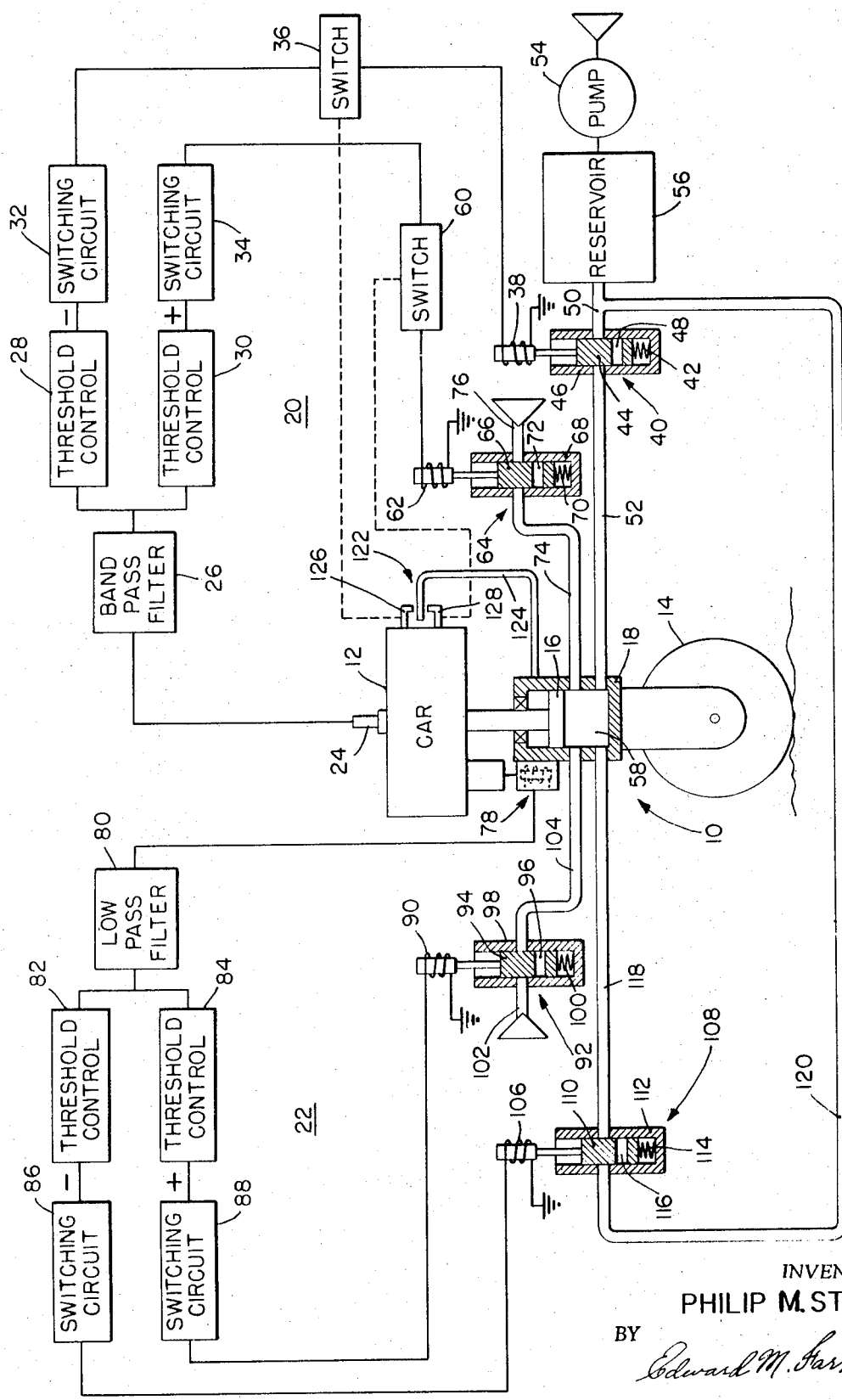

Suspension systems of various types have been used in the past. Suspension systems having flexible connections between the wheels and the main body of vehicles have also been used. The purpose of such suspension systems has been to compensate for irregularities of movement of the main body as the vehicle travels over irregular terrain or irregularities in the track surfaces.

There are a number of reasons for having relatively flexible suspension systems between the wheels and the main body of a train or other vehicle rather than have fixed connections therebetween. For example, if the wheels were connected to a rigid framework supporting passenger carrying or other pay load main body, several problems would be encountered. First, all the wheels might not be able to be on the ground at each instant of time. As a result, guidance would be impaired and impacts generated. Second, all the vehicle components would see accelerations of the same order of magnitude as the wheel accelerations. These accelerations may be high enough to generate large deviations in contact forces between the wheels and the ground. Such acceleration forces may even temporarily lift the vehicle from the ground.

If fixed suspension systems were used, the accelerations generated would tend to create stresses in the vehicle and result in discomfort to the passengers if the vehicle is a passenger train. A flexible suspension system tends to minimize these problems.

While in the past, trains and other types of wheeled vehicles have used suspension systems, such suspension systems have generally been passive. In such passive suspension systems, the configurations of the system are designed and built in anticipation of particular environmental effects. With such a system, if a changing environment is encountered, it is necessary to rework the suspension system with the vehicle at rest.

It is an object of this invention to provide an active suspension system which compensates for variations in the movement of a car while it is in operation.

It is a further object of this invention to provide an improved active suspension system wherein a car is isolated from ground irregularities beneath the wheels.

It is a further object of this invention to provide an improved active suspension system which is capable of responding quickly to fast undesired accelerations in a car to provide compensation to maintain the car in the same plane during movement.

In accordance with the present invention, an active suspension system assembly including a floating piston within a cylinder is disposed between the main body and wheels of a vehicle. Fluid is applied to the cylinder to actuate the piston, with the amount of fluid in the cylinder determining the relative distance between the main body and the wheels. An accelerometer senses irregular movements of the main body and produces electrical signals representative of the magnitude and direction of the irregular movements. The electrical signals control the amount of fluid applied to the cylinder to maintain the main body in a relatively constant plane when the wheels are subjected to relatively high accelerations.

Other objects and advantages of the present invention will be apparent and suggest themselves to those skilled in the art from a reading of the following specification and claims, in conjunction with the accompanying drawing, in which the sole figure is a schematic diagram, partly in block diagram form, illustrating one embodiment of the present invention.

The operation of the suspension system of the present invention will be described in connection with a single wheel for purposes of simplicity. It is recognized that an important consideration is the application of the suspension system to a multi-wheeled vehicle which would involve a number of similar suspension systems connected in cooperative relationship.

Referring to the sole figure of the drawing, an active suspension system 10 is disposed between a main body or car 12 and wheel 14. In the embodiment illustrated, the suspension system includes a piston 16 movably disposed within a cylinder 18. The piston 16 is fixedly mounted to the car 12 and the cylinder 18 is fixedly mounted with respect to the wheel 14. If desired the piston could be connected in fixed relationship to the wheel with the cylinder connected to the car. The piston 16 is adapted to be actuated by fluid within the chamber 58 of the cylinder 18 to vary the relative distance between the car 12 and the wheel 14 in a manner to be described.

The suspension system involving the present invention comprises basically two sub-systems. The first sub-system 20 is adapted to provide compensation for relatively fast accelerations. The second sub-system 22 is designed to compensate for relatively slow accelerations. Both of these sub-systems, while independent of each other, are combined to provide an overall improved system to maintain the car 12 in a relatively constant plane of movement during operation.

Consider first the operation of the sub-system 20. An accelerometer 24 is mounted to the car body 12. When the car body 12 vibrates or moves out of a predetermined plane of movement, electrical signals are produced by the accelerometer 24 and applied to a band pass filter 26. The band pass filter 26 is designed to pass a range of frequencies. This range of frequencies includes frequencies up to approximately 25 cycles per second and extending as low as one-half cycle per second.

The output signals from the accelerometer 24 may be either positive or negative with respect to a reference level dependent upon the direction of the accelerations of the car 12. In designing a system, it is desirable to have the suspension system responsive to movements exceeding some predetermined limits. Once these limits are exceeded, the active suspension system begins to operate to provide compensation.

The output signals from the band pass filter 26 are applied to a pair of threshold control circuits 28 and 30. The threshold control circuit 28 may be designed to produce an output signal whenever the input signal exceeds a predetermined level in the negative direction. Likewise, the threshold control circuit 30 is responsive to signals exceeding predetermined levels in the positive direction.

The output signals from the threshold control circuits 28 and 30 are applied to a pair of switching circuits 32 and 34, respectively. The switching circuits 32 and 34 may take a wide variety of forms. For example, they may be Schmitt trigger circuits which are adapted to change operating states from one state to another whenever an input signal is applied thereto. These Schmitt trigger circuits may be used to control various relays if necessary. Relays or other bi-stable circuits, well known to those skilled in the art may also be employed.

First consider a situation in which the car 10 is accelerated downwardly perpendicular to the normal desired plane of movement. A negative signal is generated by the accelerometer 24. When the signal exceeds the threshold level, the switching circuit 32 is actuated. In this case, the output signal from the switching circuit 32 is applied through a normally closed switch 36 to apply current through a coil 38.

The coil 38 controls the operation of a valve 40 which is normally held closed by a bias spring 42. The valve includes a piston-like element 44 disposed to be moved within a cylinder 46. The piston 44 includes an opening 48. When the current is applied to the coil 38, the piston 44 moves up so that the opening 48 becomes aligned with the conduits 50 and 52.

A pump 54 is employed to receive air from the atmosphere and provide fluid under pressure to a reservoir 56. When the piston 44 is actuated as a result of the current in the coil 38, fluid under pressure is applied through the conduit 52 into the chamber 58 of the cylinder 18. The fluid applied to the chamber 38 causes the piston 16 to rise. Since the car 12 was being accelerated in a down direction, the upward pressure of the piston 16 against the car 12 tends to counteract the downward movement of the car thereby providing compensation and maintaining the car movement in a relatively constant plane.

If the car is accelerated upwardly perpendicular to a plane of its desired direction of movement, a positive signal is generated by the accelerometer 24. When the positive signal applied to the threshold circuit 30 exceeds the threshold level, an output signal actuates the switching circuit 34 resulting in the application of current through a switch 60 to a coil 62.

Current through the coil 62 controls the operation of a valve 64. The valve 64 includes a movable piston 66 disposed to be moved in the cylinder 68. The piston 66 is normally held in a down position by a bias spring 70. When the piston 66 is actuated as a result of current in the coil 62, the piston 66 moves up to permit an opening 72 in the piston to become aligned with the conduits 74 and 76. The conduit 74 is connected to the chamber 58. When the opening 72 is aligned with the conduit 74, pressure is released from the chamber 58 into the atmosphere.

The releasing of fluid pressure from the chamber 58 results in the piston 16 moving downwardly. Because the movement of the car 12 was accelerated in an up direction, the downward movement of the piston 16 tends to overcome or compensate for this movement. The overall effect is that the car 12 will tend to be moved in a relatively constant plane.

It is thus seen that as the wheel 14 moves over irregular surfaces on a track tending to accelerate the car 12 out of a predetermined plane of movement, the relatively fast responsive system described will tend to counteract these changes to maintain the car in a constant plane.

The sub-system 20 is designed to take care of car movements of relatively high accelerations, with high accelerations being considered as those varying in frequency from about one-half cycle per second to twenty-five cycles per second. In addition to the sub-system 20, it is desirable in an overall system that additional means be provided to provide compensation when the car 12 is subjected to relatively slow accelerations. These accelerations may involve frequencies less than one-half cycle per second. These slow accelerations, for example, would be involved as the car moves up a hill. The sub-system 22 is designed to take care of these relatively slow accelerations.

A transducer 78, which may for example, be a differential transformer, is connected to a detect change in the distance between the car 12 and the wheel 14. When the distance between the car and the wheel varies, an output signal is generated by the differential transformer 78 to produce a positive or negative signal depending upon the direction of change.

The output signal from the transducer 78 is applied to a low pass filter 80. The low pass filter 80 may be designed to pass frequencies up to one-half cycle per second.

The output signals from the low pass filter 80 are applied to a pair of threshold control circuits 82 and 84. When the input signals exceed predetermined levels, the output signals from the threshold control circuits 82 and 84 actuate one of the switching circuits 86 or 88.

If the car 12 moves more than a predetermined level upwardly with respect to the wheel 14, a positive signal is developed by the threshold control circuit 84 and operates the switching circuit 88. Operation of the switching circuit 88 causes current to be applied to the coil 90 to control the operation of a valve 92. The valve 92 includes a piston 94 having an opening 96 disposed to be moved within the cylinder 98. The piston 94 is normally held in a down position by means of a bias spring 100.

Upon current flowing in the coil 90, the piston 94 moves upwardly to permit alignment of the opening 96 with respect to conduits 102 and 104.

When the opening 96 is aligned with the conduit 104, fluid is released from the chamber 58 into the atmosphere. This causes the piston 16 to move downwardly thereby counteracting the tendency of the car 12 to move upwardly. The overall effect is to maintain the car 12 in a relatively constant plane of movement.

When the car 12 moves down with respect to the wheel, the transducer 78 generates a negative signal which is applied to the threshold circuit 82. When the signal exceeds a pre-determined level, the switching circuit 86 is operated to cause current to flow in the coil 106. The coil 106 controls the operation of a valve 108, which includes a piston 110 disposed to move within the cylinder 112. The piston 110 is normally held in a down position by means of a bias spring 114. When the current in the coil 106 actuates the piston 110, an opening 116 becomes aligned with conduits 118 and 120.

When the opening 116 is aligned with the conduit 120, fluid under pressure is applied from the reservoir 56 into the chamber 58. At this point, the piston 16 is moved upwardly to compensate for the tendency of the car 12 to move down. The movement of the car 12 is thereby maintained in a relatively constant plane.

The sub-system 22, as has been described, is capable of providing compensation for irregular movements in the car 12 for relatively low acceleration changes. At the same time, the sub-system 20 is capable of providing compensations for relatively fast acceleration changes. It is therefore seen that both systems combined provide compensaation over a relatively wide range of changes.

In operation, it is possible that the fast acting sub-system 20 may result in excess fluid being applied to or released from the chamber 58 as a result of the operation of the sub-system 20 thereby producing excessive movement of the piston 16. To limit this excessive movement of the piston, a switching arrangement 122 includes a rod 124 fixed to the cylinder 18. A pair of contacts 126 and 128 are fixedly mounted to the car 12. When the contact 124 engages either of the contacts 126 or 128 as a result of excessive movement of the piston 16, the switching arrangement 122 operates to open one of the switches 36 or 60, dependent upon the direction of excessive movement. The opening of one of these switches 36 or 60 prevents fluids from being applied or released from the chamber 58 as a result of the operation of the sub-system 20. In this case, the sub-system 22 will continue to operate to bring the piston 16 back to its normal operating range which results in the reclosing of switches 36 and 60.

While the subject invention has been described in connection with a single wheel, it is apparent that the system is applicable to a normal car having a plurality of wheels. In a normal system, each of the wheels involved would have its own active suspension system similar to the suspension system 10. All of the suspension systems would be interrelated and designed accordingly so as to provide an overall cooperative arrangement.

Also, while the subject invention has been described in connection with vertical accelerations of the car 12, the system could be designed to compensate for other types of movements, such as movements when the car rolls as when making a turn. The two suspension systems of the type described could be disposed vertically to detect and control the rolling motions. The system could also be designed to detect and compensate for lateral movements.

While the present system has been described in connection with fluid from the atmosphere, it is apparent that other types of fluid may be employed, such as oil or the like.

The system involving the present invention has been generally described in the form of a block diagram. This was done for purposes of clarity because the components involved in the blocks are well known to those skilled in the art and only incidentally related to the present invention. For example, the bandpass filters 26 and 80 involving relatively low frequencies are commercially available and made by a number of companies. Threshold level control circuits are well known as are switching circuits involving Schmitt trigger circuits. The valves to connect or disconnect the source of fluid from the chamber 58 are also well known.

The present invention has provided a relatively efficient means capable of responding quickly to changes in the movement of the car 12 from predetermined planes, whether vertical or horizontal. This is in contradistinction to many mechanical arrangements which are not capable of responding quickly to provide compensation for irregular movements of the car.

What is claimed is:

1. In combination with a vehicle having a main body disposed to move in a plane and a wheel, active suspension means disposed between said main body and said wheel comprising a pair of elements including a cylinder with a piston movably disposed therein, one of said pair of elements being mounted in fixed relationship to said wheel with the other of said elements being mounted in fixed relationship to said main body, a source of fluid power, means for applying said fluid into said cylinder to actuate said piston with the amount of fluid in said cylinder determining the relative distance between said body and said wheel, detector means including a transducer fixedly mounted to said main body for sensing acceleration of said main body perpendicular to said plane to produce electrical signals representative of the magnitude and direction of said acceleration, means including a first filter means for passing a band of high frequency signals responsive to said electrical signals to control the amount of fluid applied to said cylinder to compensate for said acceleration to maintain said main body in said plane when said wheel is subjected to relatively high accelerations tending to move said main body out of said plane.

2. The invention as set forth in claim 1 wherein a pair of valves are actuated by said electrical signals, with one of said valves being operative to cause additional fluid under pressure to be applied to said cylinder and the other of said valves being operative to release fluid from said cylinder.

3. The invention as set forth in claim 2 wherein second detector means are provided for sensing changes in the distance between said main body and said wheel to produce second electrical signals representative of the magnitude and direction of changes in said distance and utilizing said second electrical signals to compensate for said changes in distance.

4. The invention as set forth in claim 3 wherein said second detector means includes second filter means for passing low frequency signals lower in frequency than the signals passed by said first filter means.

5. The invention as set forth in claim 4 wherein a second pair of valves are actuated by said second electrical signals, with one of said second pair of valves being operative to cause additional fluid under pressure to be applied to said cylinder and the other of said second pair of valves being operative to release fluid from said cylinder.

6. The invention as set forth in claim 5 wherein a plurality of bi-stable circuits are provided to operate said valves when the electrical signals applied thereto exceed predetermined threshold levels.

7. The invention as set forth in claim 6 wherein said bi-stable circuits are connected to produce current through coils to actuate said valves.

8. The invention as set forth in claim 7 wherein said valves include piston elements having openings therein adapted to be actuated by current through said coils to cause fluid to be applied to or released from said cylinder to vary the position of said piston.

9. The invention as set forth in claim 8 wherein a switching arrangement is provided to limit the movement of said piston as a result of electrical signals from said first filter means.

References Cited

UNITED STATES PATENTS 3,264,008  12/1970  Allinquant _____ 280—6H

PHILIP GOODMAN, Primary Examiner

U.S. Cl. X.R.

280—124F